Figure 1:
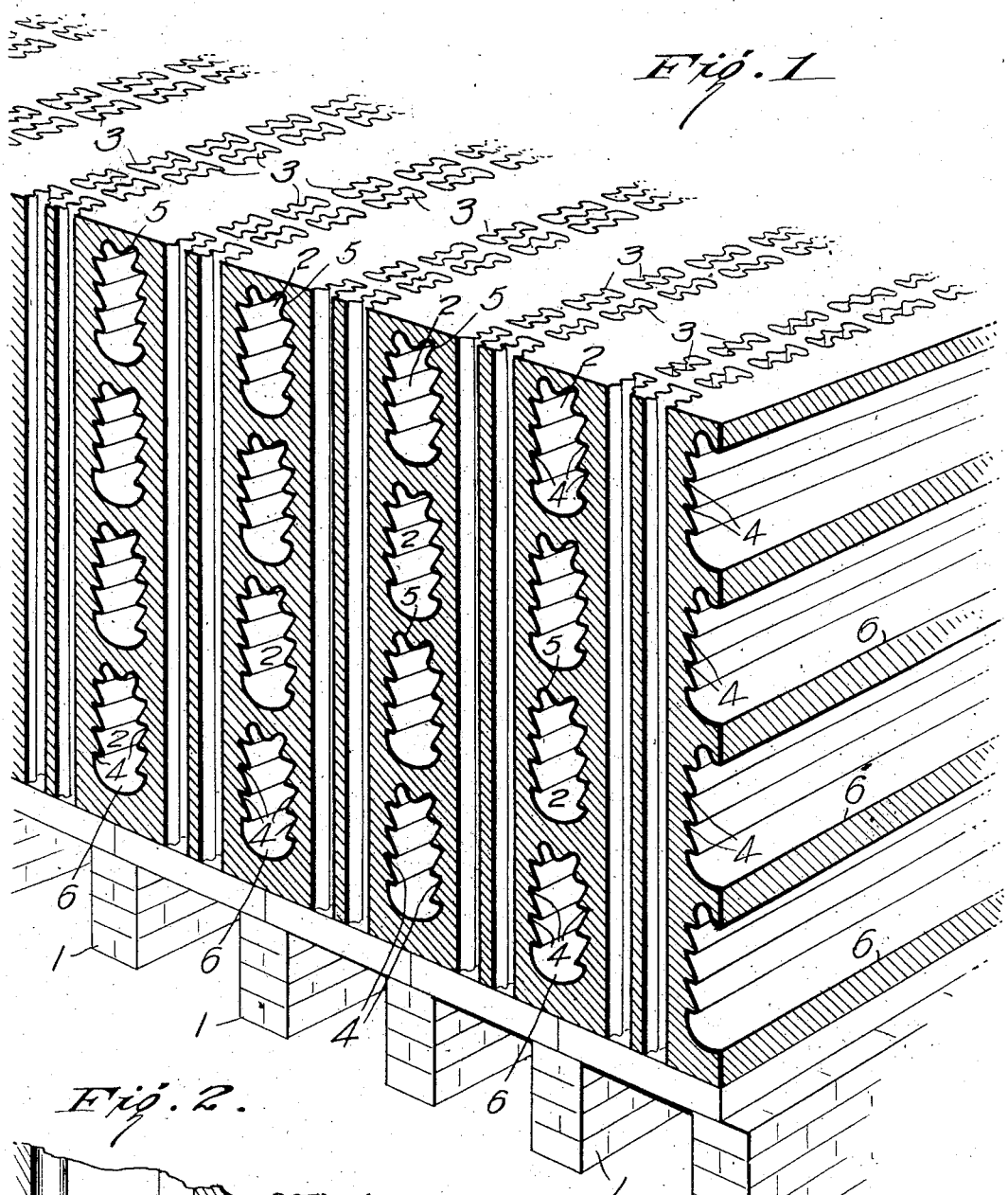

Jan. 31, 1928. 1,657,704
E. W. WESCOTT
RECUPERATOR
Filed Jan. 23, 1926      2 Sheets-Sheet 1

Inventor
E. W. WESCOTT,
By K. P. McElroy
Attorney

Jan. 31, 1928. 1,657,704
E. W. WESCOTT
RECUPERATOR
Filed Jan. 23, 1926 2 Sheets-Sheet 2

E.W.WESCOTT,
Inventor
By K. P. McElroy
Attorney

Patented Jan. 31, 1928.

1,657,704

UNITED STATES PATENT OFFICE.

ERNEST W. WESCOTT, OF NIAGARA FALLS, NEW YORK, ASSIGNOR TO COMSTOCK & WESCOTT, INCORPORATED, OF BOSTON, MASSACHUSETTS, A CORPORATION OF MASSACHUSETTS.

RECUPERATOR.

Application filed January 23, 1926. Serial No. 83,307.

This invention relates to recuperators; and it comprises a recuperator having the air and hot gas channels of monolithic construction, free of joints, air gaps and particularly of other materials than those used in the monolithic construction; such material being ordinarily and advantageously one of slight expansion and contraction under the influence of temperature changes, and of slight shrinkage during bonding; and it further comprises a method of making such a recuperator wherein molds are placed in position to form the requisite air and hot gas channels and then a body of plastic ceramic material having but slight shrinkage on drying and firing is tamped into position; all as more fully hereinafter set forth and as claimed.

An important purpose of my invention is to provide a recuperator so leak-proof as to allow of higher differential pressure between air and flue gas than has hitherto been practicable. In countercurrent operation there is necessarily some difference in pressure between the gases on the two sides of the heat-transferring wall at each end of the apparatus. The higher pressure differentials allowable in my invention permit higher air and flue gas velocities, and these higher velocities yield higher heat transfer coefficients. The higher differential pressures also allow the use of flue sections having a more favorable ratio of superficial area to cross section and hence a greater resistance to gas flow, than the simple rectangular or round sections now in use.

In the ordinary type of recuperator used for supplying hot air for combustion and other purposes, it is customary to build up a structure of tile or brick cemented together by an appropriate refractory; the structure having long and circuitous channels for hot gases and for air to be heated side by side. Usually the travel of the two is more or less in countercurrent. In using brick and ceramic materials for this purpose an interchange of heat can be secured; such materials become better conductors with an increase in temperature, following the electrical rule in this respect. Their efficiency however is not as great as is desirable and it is the purpose of the present invention to improve in this respect.

As ordinarily constructed, the seams between the tiles or brick offer considerable resistance to heat flow particularly if there is any shrinkage, giving an open seam. Even without actual openings however conductivity across a joint of this character is never good. The seams however as a matter of fact always do open to a greater or less extent in use since differential expansion cannot well be avoided. Because of this it is extremely difficult to run a recuperator at its rated efficiency without some intermixture of air and gases; nor can high differentials exist between the two sides of the separating wall. In fact the use of any high gas pressure at any point is precluded.

In chemical uses of heated air it is particularly desirable to obtain air as hot as may be and free from products of combustion or other gases than air. One typical instance where heated air is required in such an industry is in burning the chlorin out of ferric chlorid vapors (see Patent No. 1,552,786, Sept. 8, 1925).

In the present invention I have provided a type of recuperator free of the noted disadvantages and presenting certain new advantages. One of the latter is the possibility of shaping the conduits so as to obtain the best heat transmitting relationship between the solid wall and the air or gas passing thereover. In this invention, I first determine the length of path, cross section of path, and heat conducting surface required for a given furnace operation, according to the well known laws of heat transfer and resistance to gas flow applying in such cases. I then determine the total volume required to enclose the necessary ducts, including allowance for the wall thickness, and select a suitable rectangular shape of the requisite dimensions to obtain the required volume. Having designed and if desired built the rest of the furnace about or adjacent to space for this rectangular block, and having furnished either temporary wood or metal walls surrounding the space reserved for the block, or having erected the permanent brick walls to form the sides of the block, I then proceed to arrange in the bottom of the rectangular space so defined a series of forms, forming the first row of ducts. These forms may be of wood, preferably hollow, or of metal, or of other suitable material. They are made removable through apertures provided, being furnished with a "draw", or else are of wood or of other combustible material so arranged that they can be burned out. I then proceed to tamp a suitable refractory composition below, on, and over the forms. After these have been covered to a depth of approximately one half the distance to the next set of forms, I insert the latter, which are held in place by connecting members, by pins inserted in the wall, or are otherwise suitably spaced in position. I then proceed to tamp in a refractory composition as before and proceed in this manner until the block is completed. Having completed the block and allowed a suitable amount of preliminary drying, which may well take place as the tamping is carried on, I remove the metal forms, if such are used, from the ducts and open such apertures as have been left in the structure. I then cause a circulation of warm air through the ducts in the structure by sucking or blowing with a fan or natural draft the hot gases from a wood fire, or exit gas from a furnace if such be available. After the structure has received a thorough preliminary drying such as is given refractory hollow ware I ignite the wooden forms, if such have been used, and burn them out with a gentle draft, and then I gradually increase the temperature of the gases which are being drawn through the ducts. I finally increase this temperature to the maximum which is to be used and allow this temperature to become set up in the whole of the recuperator, by preventing circulation of air or other cooling agent through the air ducts, so that the entire mass is thoroughly fired just as would be the case if the material were being burned in a kiln. This drying and firing operation requires very little more time than is ordinarily allowed for the first firing up of a recuperator made from previously fired tile.

The brick work surrounding the recuperator block is buck-stayed as is usual to assist in counteracting the effects of expansion and contraction.

If the recuperator is to be very large it is advisable to sectionalize it either horizontally or vertically. If the split is made horizontally it is effected merely by leveling off and tamping hard between two horizontal sets of ducts. It is advantageous to sweep on a thin layer of powdered graphite or other ceramically inert material i. e. material which will not readily set. Such materials are aloxite fines, carborundum fines, powdered chrome ore, etc. etc. Aloxite fines, carborundum and other similar refractories are electric furnace products which means that they have been exposed to an extremely high temperature in production. They have no further shrinkage at any temperature involved in the ordinary use of a recuperator.

If the recuperator is long rather than high, or if for other reasons it is desired to give it vertical separations, a temporary side wall must be used. After forming one section the temporary side wall is moved along and the vertical wall against which fresh material is to be tamped is dusted with inert material before tamping in a new section.

In sectionalizing the recuperator the sections should best be so placed as to cut through only one variety of duct, or preferably no ducts at all. This is desirable but not absolutely essential.

It is not of course necessary, although usually desirable, that the recuperator sections should be tamped and fired on the exact spot upon which they are to be used. Previous attempts to increase the efficiency of recuperators by corrugating the walls of the ducts have failed, partly because of increased cost, fragility, etc., but chiefly in my opinion because the increased gas pressures required to cause flow past the corrugations produced prohibitiv leaks through the enormous number of joints present, and partly because the indicated advantages as to heat transfer were rendered at least in part illusory by the air gap resistance between adjacent blocks.

Where the finished recuperator block made according to the present invention may incidentally show cracks, due to the use of too much clay or to the grog not being sufficiently dense and inert, these cracks can be closed up by swabbing the inside of the tubes or ducts with a suitable refractory cement.

My invention is applicable in the construction of regenerators as well as of heat recuperators.

Figure 2:
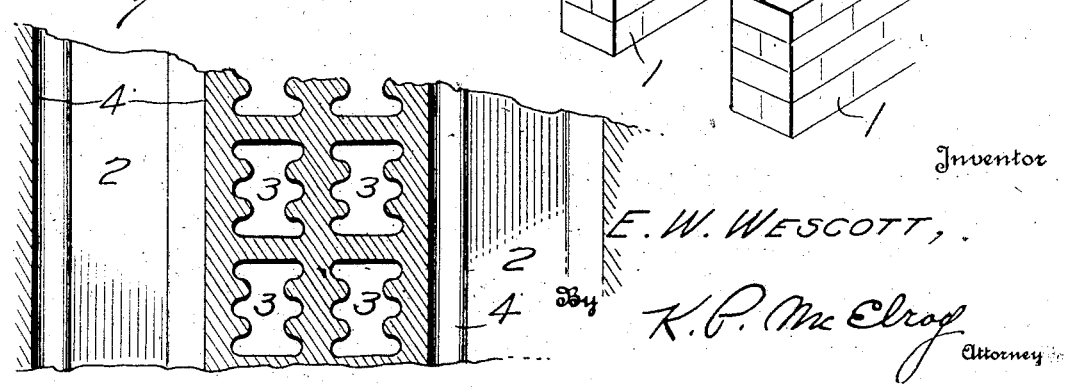
Figure 3:
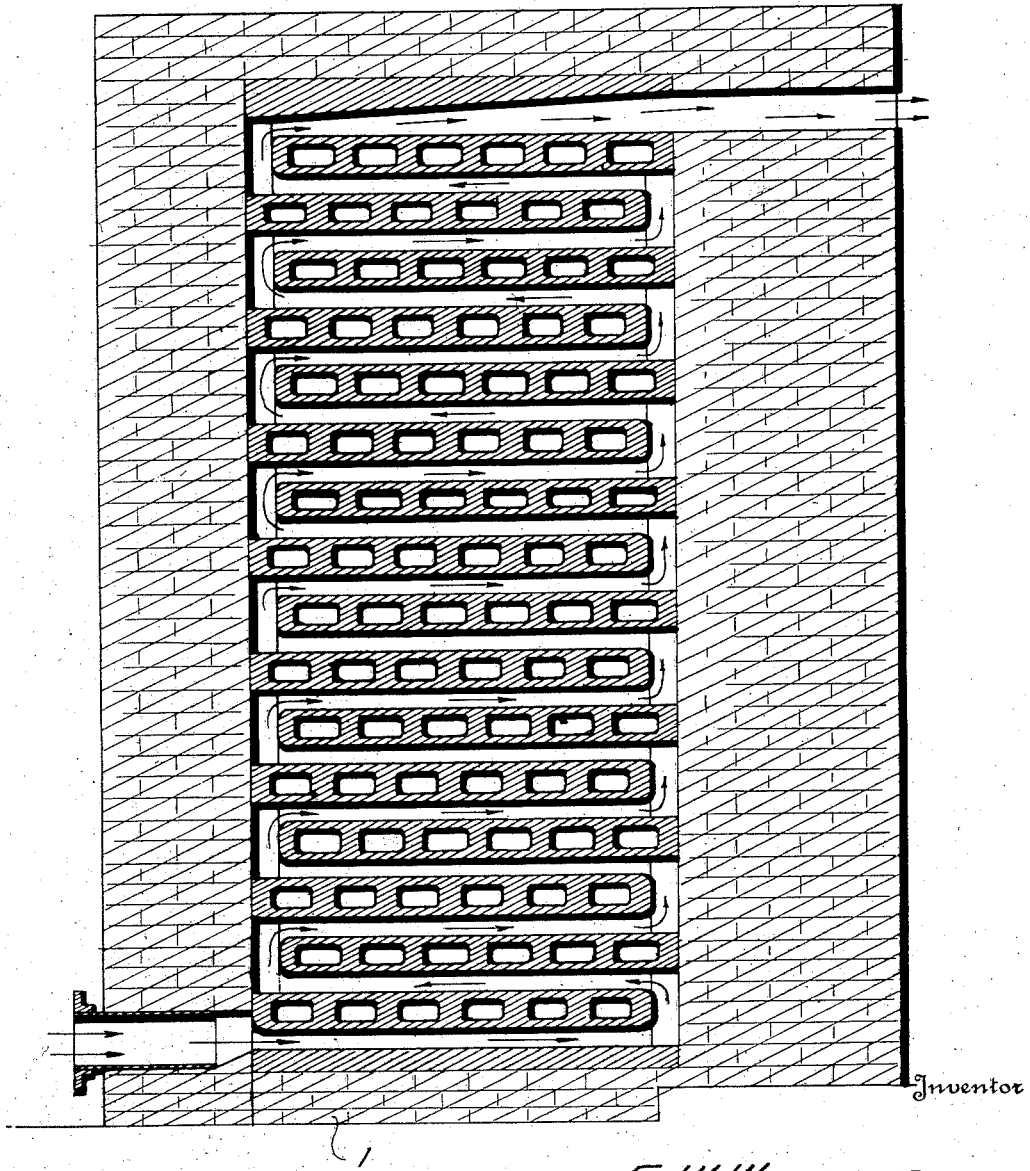

In the accompanying drawing showing one form of recuperator in accordance with my invention, Figure 1 is a fragmentary view partly in section and partly in perspective, the hot air and gas channels being at right angles to each other;

Figure 2 is a fragmentary horizontal section sufficient to show the cross section of the vertical ducts; and Figure 3 is a vertical section through a recuperator having plane walled ducts.

The recuperator is built upon suitable foundations 1, the gas flues are indicated at 2 and the air flues at 3. The forms or molds for the gas and air ducts are of a shape conforming to the ducts as shown in these flues. I find that the particular shape of duct shown materially adds in the transference of heat between solid and gas in the recuperator. The vertical flues in Fig. 1 are best used for air and the horizontal flues for hot flame gases or products of combustion, the lower portion marked 6 of the horizontal flues, free from serrations, providing space for the accumulation of dust and its ready removal. Use of walls of, so to speak, serrated cross section as shown in Fig. 1, is advantageous, but walls of the ordinary shape may be employed as shown in Fig. 3. In making the corrugated form shown it is advantageous to have upper surfaces in horizontal flues sharply sloping to prevent the accumulation of flue dust. In the horizontal ducts of Fig. 1 there are virtually narrow lateral and top, respectively marked 4 and 5, auxiliary passages which operate effectually to provide increased heat transfer surface upon which dust cannot readily settle. In the structure as shown in Fig. 2 it will be noted that the vertical ducts are made more symmetrical but are provided with a plurality of lateral channels of large superficial area.

By the use of ducts of the form shown there is obtained a considerably higher ratio between the useful area of heat-transferring surface and the cross section area than can be obtained with ducts of any simple geometrical cross section.

While various highly refractory materials may be used for the present purposes, carborundum is quite satisfactory. A mix may be prepared by crushing a good grade of crude carborundum, or silicon carbid, in pan mills until practically none of the material is coarser than about 12-mesh. With a good grade material at this time the crushed product will contain 21 to 28 per cent of grain retained on a 20-mesh screen. The residue is finer. The crushed material is washed to remove graphite dust and any excessively fine silicon carbide or other extremely fine dirt. Washing at this stage to remove graphite is quite important since crude carborundum usually contains it. The material is next mixed with fine ground sagger clay in an amount sufficient to fill the voids. With material prepared as described, filling the voids will usually require about 8 per cent by weight of clay. The mixture is then dampened with any suitable temporary binder such as water and molasses, sulfite waste liquor, etc. The binder should be organic so that it will burn away without leaving a fluxing residue. Sodium silicate is not applicable. Usually about 1 part of organic binder with 6 parts of water is sufficient for moistening 100 parts of mixed clay and grain to the right consistency. The sagger clay used should be close-burning and vitrify at about 1350° C. Suitable clay should have a long vitrifying range; that is to say, there should be a wide range of temperature between the point at which vitrification begins and that at which it completes.

This particular mix of ceramic materials and others of the same type produced with the aid of electric furnace products, that is of products which have been exposed to an extremely high temperature, is so non-shrinking that in making the recuperator the molding elements can be made of exactly the dimensions desired in the finished article. In other ceramic practice a large shrinkage allowance has to be made but none such is necessary with these mixes. Non-shrinkage materials are of great importance in heat exchanging apparatus made under the present invention. A monolithic recuperator made with ordinary fire clay grog and clay in addition to shrinking in firing would develop numerous cracks and require much patching before use. While the use of materials having some shrinkage is practicable they are not advantageous. Materials suited for my purpose will produce a structure in which the grog particles will have substantially the same density wherever taken in the recuperator; that is whether taken from the highly fired portions or from slightly fired portions. The space relationship of the grog particles, as ascertained by thin section study of the fired materials made under the present invention, will be the same whether taken from highly fired or slightly fired portions. Thin section views of the material of properly prepared recuperators under the present invention will show the grog particles jammed against each other and practically as closely packed as would be the case if no bond had been used.

What I claim is:—

1. As a new recuperator, a monolithic recuperator composed of fired ceramic material.

2. As a new recuperator, a monolithic recuperater composed of fired ceramic material, such material being mainly a product which has been subjected to a high temperature in an electric furnace.

3. As a new recuperator, a monolithic recuperator composed of a ceramic mix of closely disposed particles adapted to retain their space relationship where subjected to a high temperature.

4. As a new recuperator, a monolithic recuperator composed of fired ceramic material, such material being a granular refractory which has been subjected to a high temperature bonded by a clay having a long vitrifying range.

5. A monolithic recuperator having corrugated ducts formed with downwardly sloping upper surfaces.

6. A monolithic recuperator having ducts with corrugated surfaces, upper surfaces in horizontal ducts being sharply sloping.

In testimony whereof, I have hereunto affixed my signature.

ERNEST W. WESCOTT.